US012230921B2

(12) United States Patent
Van Swearingen et al.

(10) Patent No.: US 12,230,921 B2
(45) Date of Patent: Feb. 18, 2025

(54) COAXIAL CABLE CONNECTOR INTERFACE FOR PREVENTING MATING WITH INCORRECT CONNECTOR

(71) Applicant: Outdoor Wireless Networks LLC, Claremont, NC (US)

(72) Inventors: Kendrick Van Swearingen, Woodridge, IL (US); David J. Smentek, Lockport, IL (US); Ronald A. Vaccaro, Taylorsville, NC (US)

(73) Assignee: Outdoor Wireless Networks LLC, Claremont, NC (US)

( * ) Notice: Subject to any disclaimer, the term of this patent is extended or adjusted under 35 U.S.C. 154(b) by 155 days.

(21) Appl. No.: 17/931,696

(22) Filed: Sep. 13, 2022

(65) Prior Publication Data

US 2023/0006397 A1 Jan. 5, 2023

Related U.S. Application Data

(63) Continuation of application No. 16/986,355, filed on Aug. 6, 2020, now abandoned, which is a (Continued)

(51) Int. Cl.
*H01R 13/642* (2006.01)
*H01R 13/187* (2006.01)
(Continued)

(52) U.S. Cl.
CPC ........... *H01R 13/642* (2013.01); *H01R 13/64* (2013.01); *H01R 24/38* (2013.01); *H01R 13/187* (2013.01); *H01R 2103/00* (2013.01)

(58) Field of Classification Search
None
See application file for complete search history.

(56) References Cited

U.S. PATENT DOCUMENTS 3,980,388 A 9/1976 Nailor
4,553,806 A * 11/1985 Forney, Jr. ........... H01R 24/562 439/585

(Continued)

FOREIGN PATENT DOCUMENTS

CN 201523138 U 7/2010
CN 203423327 U 2/2014

(Continued)

OTHER PUBLICATIONS

"Examination Report corresponding to European Application No. 16789785.9 dated Mar. 23, 2022".

(Continued)

*Primary Examiner* — Oscar C Jimenez
(74) *Attorney, Agent, or Firm* — Myers Bigel, P.A.

(57) ABSTRACT

A 4.3/10 coaxial connector configured to receive a mating 4.3/10 connector includes: an inner contact; a dielectric spacer; and an outer contact, the dielectric spacer separating the inner contact and the outer contact. The outer contact includes an outer wall and a plurality of spring fingers, the spring fingers configured to deflect radially inwardly when the mating 4.3/10 connector is mated. The connector further comprises blocking structure that prevents mating of a Mini-Din connector.

23 Claims, 16 Drawing Sheets

Related U.S. Application Data continuation of application No. 16/688,417, filed on Nov. 19, 2019, now Pat. No. 11,201,435, which is a continuation of application No. 15/963,684, filed on Apr. 26, 2018, now Pat. No. 10,559,925, which is a continuation of application No. 15/141,526, filed on Apr. 28, 2016, now Pat. No. 9,966,702.

(60) Provisional application No. 62/157,805, filed on May 6, 2015, provisional application No. 62/157,868, filed on May 6, 2015, provisional application No. 62/157,328, filed on May 5, 2015, provisional application No. 62/156,131, filed on May 1, 2015.

(51) Int. Cl.

| | |
|---|---|
| ***H01R 13/64*** | (2006.01) |
| ***H01R 24/38*** | (2011.01) |
| ***H01R 103/00*** | (2006.01) |

(56) References Cited

U.S. PATENT DOCUMENTS

| | | | | |
|---|---|---|---|---|
| 4,619,496 | A | 10/1986 | Forney et al. | |
| 4,746,305 | A | 5/1988 | Nomura | |
| 5,456,611 | A | 10/1995 | Henry et al. | |
| 5,595,499 | A | 1/1997 | Zander et al. | |
| 6,024,609 | A | 2/2000 | Kooiman et al. | |
| 6,287,144 | B1 | 9/2001 | Baffert | |
| 6,705,884 | B1 | 3/2004 | McCarthy | |
| 7,927,135 | B1 | 4/2011 | Wlos | |
| 8,025,536 | B1 | 9/2011 | Kelly | |
| 8,888,528 | B2 | 11/2014 | Van Swearingen et al. | |
| 9,425,548 | B2 | 8/2016 | Van Swearingen | |
| 9,570,819 | B2 | 2/2017 | Vaccaro | |
| 9,831,619 | B2 * | 11/2017 | Mahmood | H01R 24/38 |
| 9,893,466 | B2 | 2/2018 | Wu et al. | |
| 9,966,702 | B2 | 5/2018 | Swearingen et al. | |
| 10,044,152 | B2 | 8/2018 | Rajpal | |
| 10,658,794 | B2 | 5/2020 | Zhang et al. | |
| 2004/0248475 | A1 | 12/2004 | Seminara et al. | |
| 2007/0099456 | A1 | 5/2007 | Chawgo | |
| 2007/0275584 | A1 | 11/2007 | Keating | |
| 2008/0194142 | A1 | 8/2008 | Wlos | |
| 2009/0035987 | A1 | 2/2009 | Daly et al. | |
| 2010/0124839 | A1 | 5/2010 | Montena | |
| 2011/0053395 | A1 | 3/2011 | Leibfried | |
| 2011/0130048 | A1 | 6/2011 | Haunberger et al. | |
| 2012/0064767 | A1 | 3/2012 | Islam et al. | |
| 2015/0024628 | A1 | 1/2015 | Haegele et al. | |
| 2015/0229070 | A1 | 8/2015 | Van Swearingen | |
| 2016/0233627 | A1 | 8/2016 | Rajpal | |
| 2016/0308307 | A1 | 10/2016 | Wu et al. | |
| 2016/0336676 | A1 | 11/2016 | Stevens et al. | |
| 2018/0205175 | A1 * | 7/2018 | Wimmer | H01R 13/5219 |
| 2021/0066841 | A1 * | 3/2021 | Stevens | H01R 13/05 |

FOREIGN PATENT DOCUMENTS

| | | | |
|---|---|---|---|
| EP | 2605338 | A1 | 6/2013 |
| GB | 1177220 | A | 1/1970 |
| JP | 2003526872 | A | 9/2003 |
| JP | 2009054320 | A | 3/2009 |
| KR | 100646756 | B1 | 11/2006 |
| KR | 101097281 | B1 | 12/2011 |

OTHER PUBLICATIONS

"Extended European Search Report corresponding to European Application No. 16789785.9 dated Nov. 27, 2018".
"International Search Report and Written Opinion Corresponding to International Application No. PCT/US2016/029739; Date of Mailing: Sep. 20, 2016; 13 Pages".
"Notification of Transmittal of International Preliminary Report on Patentability corresponding to International Application No. PCT/US2016/029739; mailed Aug. 9, 2017".
"Office Action corresponding to Chinese Application No. 201680033159.0 dated Feb. 12, 2019".
"Office Action corresponding to Chinese Application No. 201680033159.0 dated May 18, 2020".
"Third Party observations corresponding to European Application No. 16789785.9 dated May 6, 2021".
"Radio Frequency Connector Interfaces for MIL-DTL-3643, MIL-DTL-3650, MIL-DTL-3655, MIL-DTL-25516, MIL-PRF-31031, MIL-PRF-39012, MIL-PRF-49142, MIL-PRF-55339, MIL-DTL-83517", Department of Defense Interface Standard MIL-STD-348B (Aug. 17, 2014).
Chinese Office Action corresponding to CN 201680033159.0; issued Jan. 3, 2024, (24 pages, including English translation).
"Third Party Observations corresponding to European Application No. 16789785.9 dated Oct. 28, 2022".

* cited by examiner

| NAME | X | Y |
|---|---|---|
| 1B | 0.6980 | -41.9734 |
| 2B | 0.8060 | -40.9872 |
| 3B | 0.9600 | -39.9640 |
| 4B | 1.7100 | -38.6690 |
| 5B | 2.1700 | -40.4602 |
| 6B | 2.2000 | -40.6532 |
| 7B | 2.4000 | -42.1272 |
| 8B | 2.7000 | -44.7770 |
| 9B | 3.0000 | -47.7781 |
| 10B | 4.0000 | -37.3056 |
| 1A | 0.6980 | -62.2882 |
| 2A | 0.8050 | -58.9844 |
| 3A | 0.9600 | -54.7803 |
| 4A | 1.7100 | -40.7115 |
| 15A | 2.1700 | -35.3314 |
| 16A | 2.2000 | -35.0396 |
| 17A | 2.4000 | -33.2601 |
| 18A | 2.7000 | -31.0975 |
| 19A | 3.0000 | -29.4916 |
| 20A | 4.0000 | -28.6796 |

COAXIAL CABLE CONNECTOR INTERFACE FOR PREVENTING MATING WITH INCORRECT CONNECTOR

RELATED APPLICATIONS

The present application is a continuation of and claims priority to U.S. patent application Ser. No. 16/986,355 filed Aug. 6, 2020, which is a continuation of and claims priority to U.S. patent application Ser. No. 16/688,417 filed Nov. 19, 2019, now U.S. Pat. No. 11,201,435, which is a continuation of and claims priority to U.S. patent application Ser. No. 15/963,684 filed Apr. 26, 2018, now U.S. Pat. No. 10,559, 925, which is a continuation of and claims priority to U.S. patent application Ser. No. 15/141,526 filed Apr. 28, 2016, now U.S. Pat. No. 9,966,702, and claims the benefit of U.S. Provisional Patent Application Nos. 62/156,131, filed May 1, 2015, 62/157,328, filed May 5, 2015, 62/157,805, filed May 6, 2015, and 62/157,868, filed May 6, 2015, the disclosures of which are hereby incorporated herein in their entireties.

FIELD OF THE INVENTION

The present invention relates generally to electrical connectors, and more specifically to coaxial connectors.

BACKGROUND

Coaxial cables are commonly utilized in radio frequency (RF) communications systems. Coaxial connectors are typically attached to the ends of cables to enable the cables to be connected with equipment or other cables. Connector interfaces provide a connect/disconnect functionality between a cable terminated with a connector and a corresponding connector with a mating connector interface mounted on an apparatus or another cable.

An RF coaxial connector interface commonly referred to as 4.3/10 is under consideration by the International Electrical Commission, an international standards body, to become a standardized coaxial connector interface as matter IEC(46F/243/NP). The 4.3/10 connector interface can be connected with a tool, by hand, or as a "quick-connect" connector. As shown in FIGS. 1 and 2, the 4.3/10 female connector 5 (shown on the left side of the figures) has an outer contact 10 with spring fingers 12 that engage an inner diameter of a mating interface cylinder 15 of the 4.3/10 male connector 20 (shown on the right side of the figures). Such engagement establishes electrical contact between the outer contacts of the connectors 5, 20.

Early adopters of the 4.3/10 connection interface have applied these connectors to communications equipment such as cellular base station antennas. In some cases, the same equipment includes connections for multiple types of connector interfaces, which are often selected based upon the diameter of each of the coaxial cables being connected to the device.

One of these alternative connectors is referred to as 4.1-9.5 or "Mini-Din" connector. The Mini-Din male connector 25 (shown on the right side of FIGS. 3 and 4) has a smaller overall connection interface that utilizes a similar but smaller diameter outer conductor connection cylinder 30. The male outer conductor cylinder 30 includes a beveled and/or radiused outer leading edge 35 (see FIGS. 4 and 10). The Mini-Din utilizes a coupling nut 40' with the same threading configuration as the 4.3/10 coupling nut 40. Because the Mini-Din connector 25 looks nearly the same and employs the same coupling nut 40' as a 4.3/10 male connector 20, an installer may mistakenly attempt to attach a Mini-Din male connector 25 to a 4.3/10 female connector 5. If the initial resistance is overcome, the spring fingers 12 of the outer contact 10 of the 4.3/10 may be splayed outward (see FIG. 5), thereby enabling insertion of the Mini-Din connector 25 to the point where the threads of the coupling nut 40' threads are engaged. At this point, further threading of the coupling nut 40', particularly with the force multiplying effect of the threads and ability to apply a wrench for additional leverage, may result in an erroneous interconnection. As shown in FIG. 5, the spring fingers 12 of the 4.3/10 outer contact 10 may be permanently splayed, thus preventing later interconnection with the correct 4.3/10 male connector 20 (see FIG. 6). In addition to destroying the female 4.3/10 connector 5, which renders equipment upon which is mounted unusable, the erroneous connection with a Mini-Din connector 25 may enable damaging mis-directed transmission of improper power/signals to further downline equipment.

In view of the foregoing, it may be desirable to provide an alternative connection interface that is compatible with existing 4.3/10 connectors.

SUMMARY

As a first aspect, embodiments of the invention are directed to a similar interface blocking coaxial connector interconnectable with a 4.3/10 coaxial connector connection interface. The connector comprises: an inner contact defining a longitudinal axis; and an outer contact positioned radially outwardly from the inner contact and having axially-extending spring fingers. Each of the spring fingers includes a radially-inward protrusion projecting to an inner diameter less than an inner diameter of a male Mini-Din outer conductor cylinder.

As a second aspect, embodiments of the invention are directed to a similar interface blocking coaxial connector, interconnectable with a 4.3/10 coaxial connector connection interface, comprising: an inner contact that defines a longitudinal axis; and an outer contact with a distal end and a plurality of spring fingers. The distal end is located such that the distal end interferes with a Mini-Din connector before contact occurs between the spring fingers and an outer conductor cylinder of the Mini-Din connector.

As a third aspect, embodiments of the invention are directed to a similar interface blocking coaxial connector, interconnectable with a 4.3/10 coaxial connector connection interface, comprising: an inner contact defining a longitudinal axis; a cylindrical outer contact with a plurality of spring fingers; and a barrier plug retained proximate a distal end of the spring fingers that creates a stop face adjacent an inner diameter of the outer contact.

As a fourth aspect, embodiments of the invention are directed to a 4.3/10 coaxial connector configured to receive a mating 4.3/10 connector, comprising: an inner contact; a dielectric spacer; and an outer contact, the dielectric spacer separating the inner contact and the outer contact. The outer contact includes an outer wall and a plurality of spring fingers, the spring fingers configured to deflect radially inwardly when the mating 4.3/10 connector is mated. The connector further comprises blocking structure that prevents mating of a Mini-Din connector.

As a fifth aspect, embodiments of the invention are directed to a method of constructing a coaxial connector, comprising the steps of:

(a) identifying a coaxial connector, comprising: an inner contact configured to be mated with an inner conductor of a coaxial cable; an outer conductor body configured to be mated with an outer conductor of the coaxial cable, the outer conductor extension having a first outer body with a gap; wherein the gap is configured to receive a free end portion of a mating connector to establish an electrical connection; and wherein the first outer body includes first fingers that generally form a ring and deflect a first deflection distance radially inwardly during engagement of the coaxial connector with the mating connector, wherein the deflected first fingers exert a radially outward force on the mating connector, and wherein the first fingers have a first length, a first width, and a first thickness;

(b) selecting a second length, second width, and second thickness for second fingers of a second outer body, wherein the at least one of the second length, second width and second thickness differs from the first length, first width, and first thickness;

(c) selecting a second deflection distance for the second fingers; wherein the selections of steps (b) and (c) induce a radially outward force that is substantially the same as the radially outward force defined in step (a); and (d) constructing the second outer body.

BRIEF DESCRIPTION OF THE FIGURES

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

As described above, erroneous mating of a Mini-Din connector with a 4.3/10 connector can damage the 4.3/10 connector to the extent that it becomes unusable. Below are described different approaches for a coaxial connector interface that is mechanically and electrically compatible with the 4.3/10 interface specification, but which inhibits erroneous interconnection with similar coaxial interfaces like the Mini-Din connector.

Figure 1:
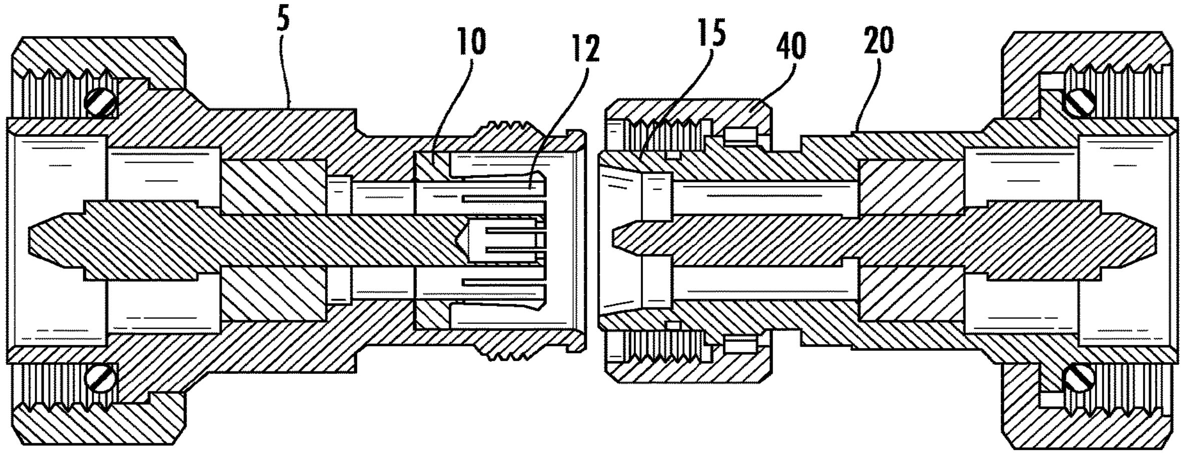
FIG. 1 is a schematic side view of a 4.3/10 connection interface male and female connector pair aligned for interconnection.
Figure 2:
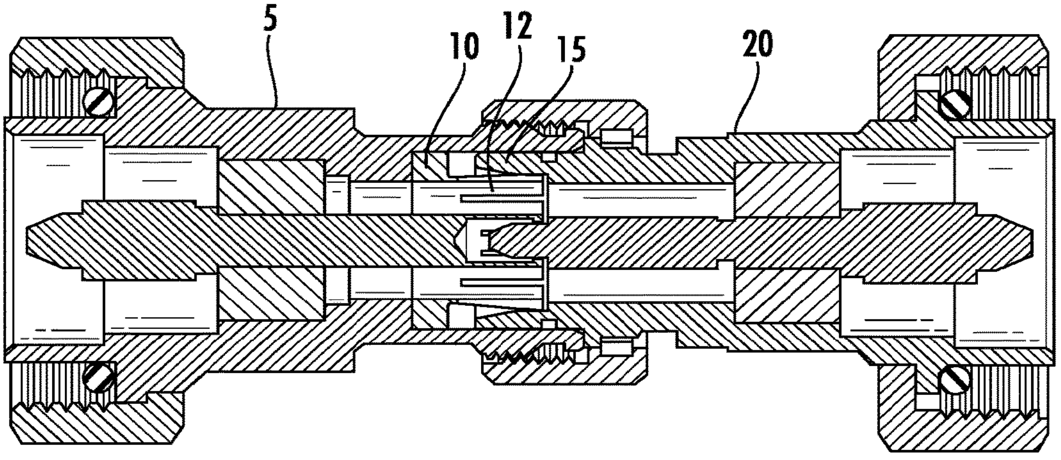
FIG. 2 is a schematic side view of the 4.3/10 connectors of FIG. 1 mated together.
Figure 3:
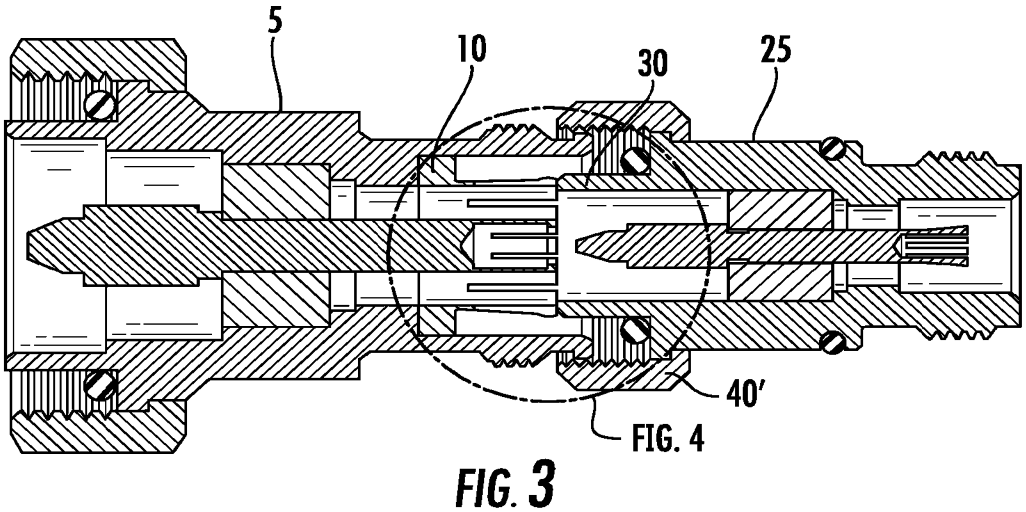
FIG. 3 is a schematic side view of the 4.3/10 female connector of FIG. 1 aligned for erroneous interconnection with a representative Mini-Din male connector.
Figure 4:
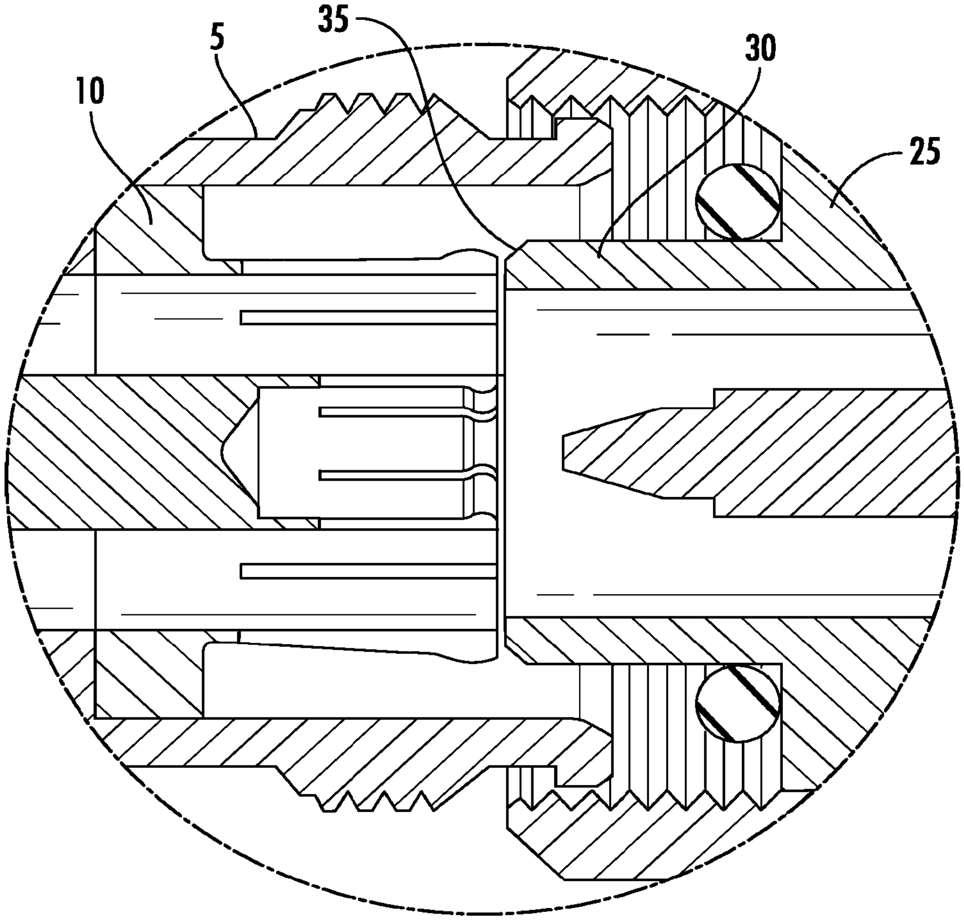
FIG. 4 is a schematic enlarged view of the connectors of FIG. 3, showing the minimal lip and beveled outer edge of the Mini-Din male connector that may be easily overcome to initiate an erroneous interconnection.
Figure 5:
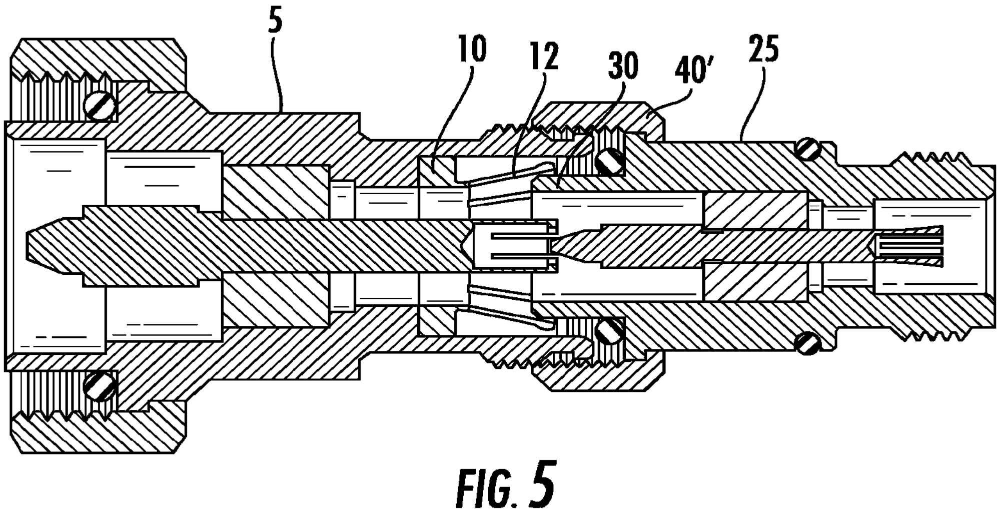
FIG. 5 is a schematic side view of the 4.3/10 female connector of FIG. 3, with the outer contact initially splayed to erroneously receive the Mini-Din male connector of FIG. 3, as the threads begin to mate.
Figure 6:
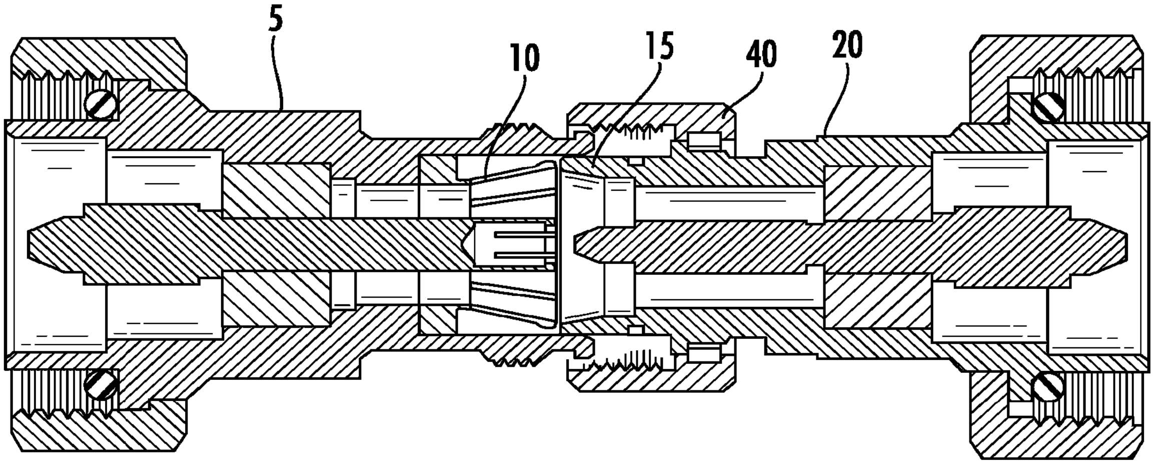
FIG. 6 is a schematic side view of a 4.3/10 female connector with its outer contact splayed by an erroneous connection with the Mini-Din connector as in FIG. 5, shown aligned with but no unable to mate with a 4.3/10 male connector.

In one approach, it is recognized that, although the 4.3/10 interface includes a generally cylindrical space CS within the inner diameter of the fingers 12 of the outer contact 10 of the female connector 5 (best shown in FIG. 2), because all of the electrical and mechanical interconnections are in fact made via the outer diameter of the fingers 12, this cylindrical space CS is not a requirement to enable interconnection with a 4.3/10 interface.

Figure 7:
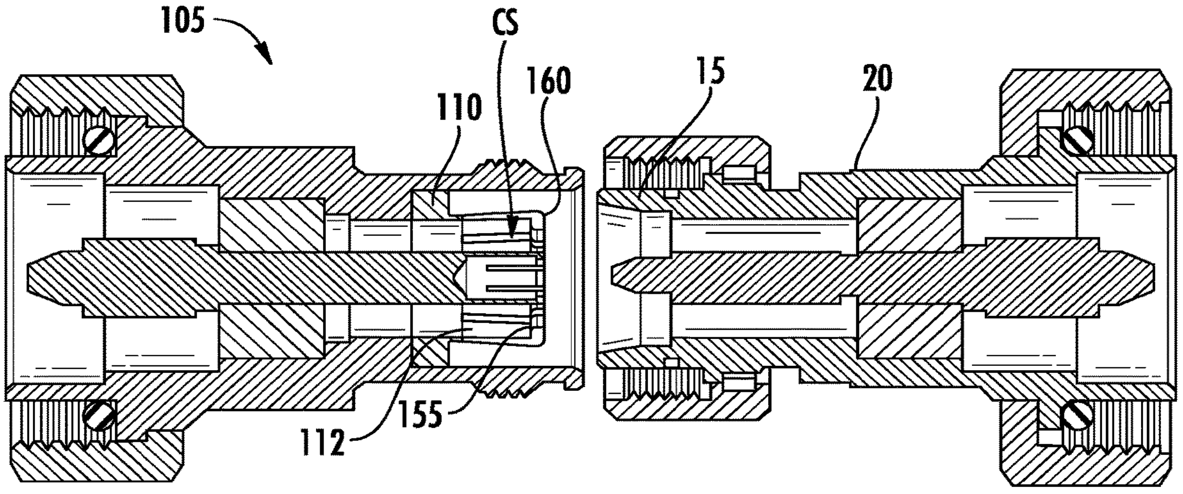
FIG. 7 is a schematic side view of an exemplary female connector according to embodiments of the invention, aligned for interconnection with a 4.3/10 male connector.
Figure 8:
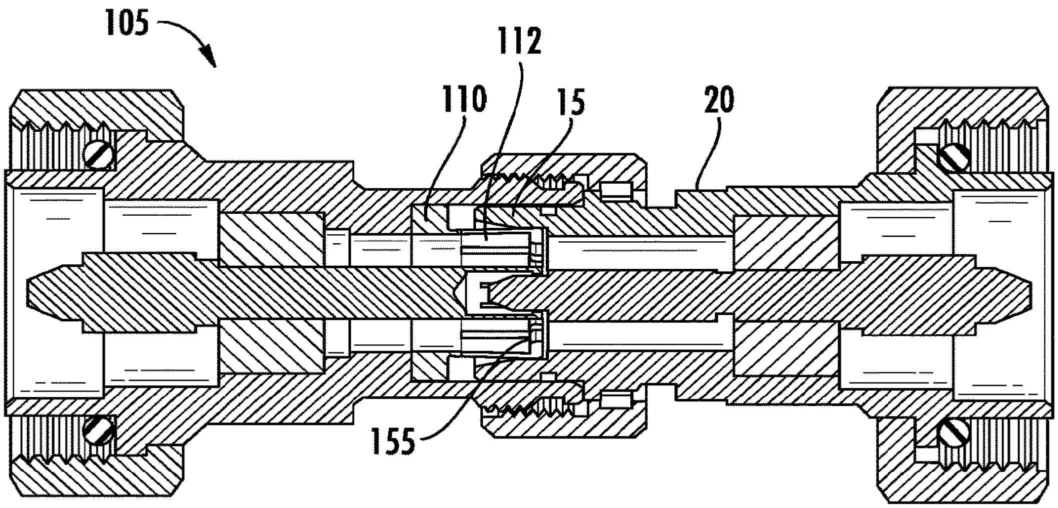
FIG. 8 is a schematic side view of the female connector of FIG. 7 interconnected with a 4.3/10 male connector.

As shown in FIGS. 7 and 8, an exemplary female connector 105 includes an outer contact 110 with fingers 112 having inwardly-projecting protrusions 155 on their distal ends. The protrusions 155 provide additional surface area at the distal end to form blocking surfaces 160 (best shown in FIG. 10) to the cylindrical space CS. The presence of the blocking surfaces 160 securely inhibits splaying of the outer contact spring fingers 112 if an interconnection with a Mini-Din connector is erroneously attempted by an installer.

Figure 9:
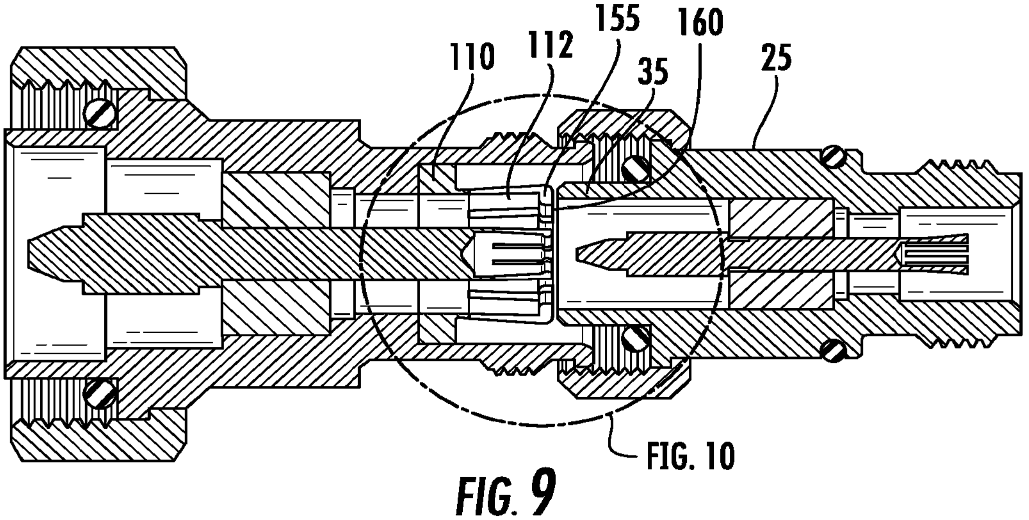
FIG. 9 is a schematic side view of the female connector of FIG. 7 aligned for an attempted incorrect interface with a male Mini-Din connector, demonstrating the planar blocking face of the outer contact opposing the male Mini-Din male cylinder, thereby inhibiting splaying of the outer contact.
Figure 10:
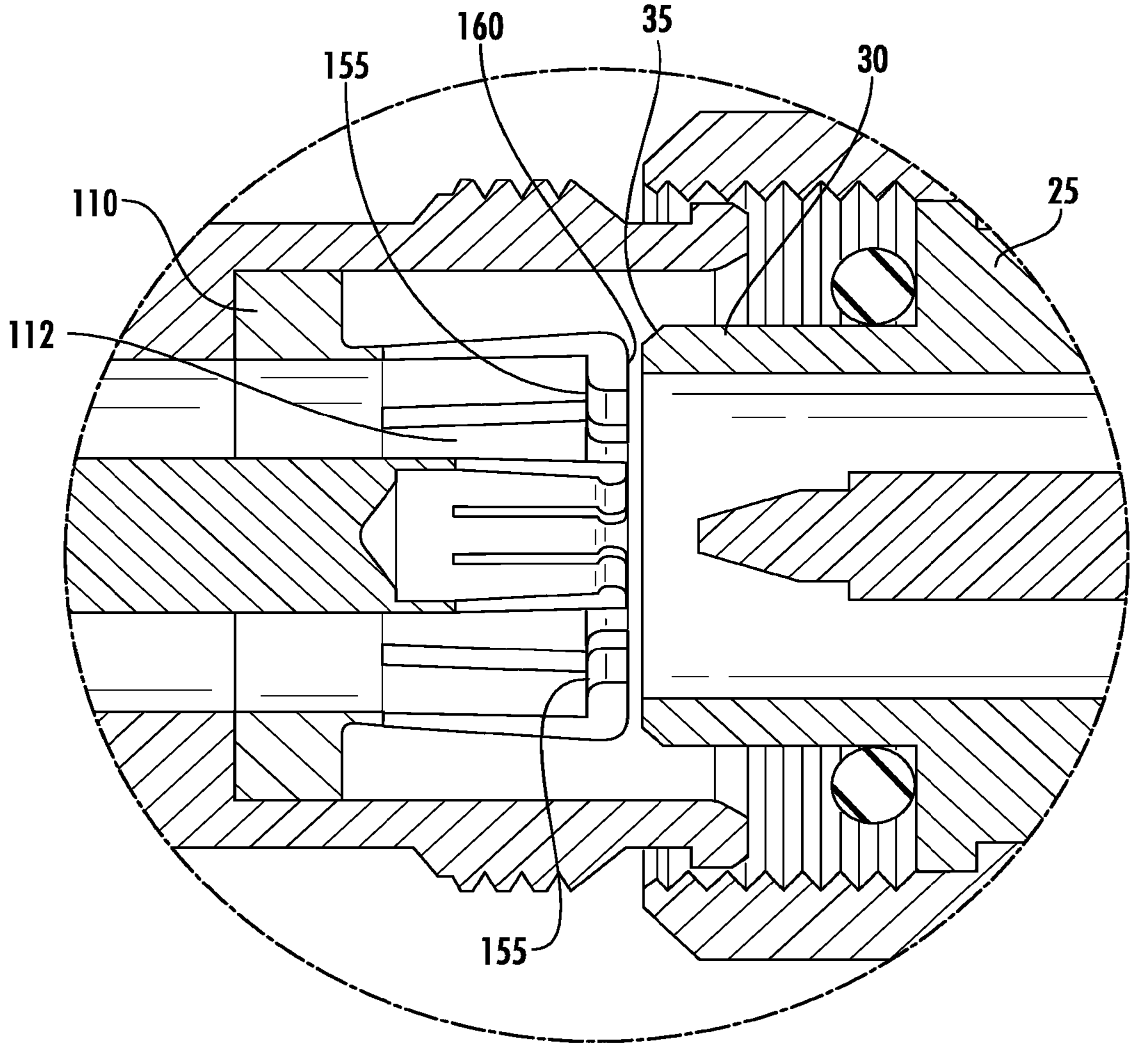
FIG. 10 is an enlarged view of area B of FIG. 9.

The blocking surfaces 160 comprising the distal end of each of the outer contact spring fingers 112 may be generally planar (e.g., they may be aligned normal to a longitudinal axis of the outer contact 110). The blocking surfaces 160 may form a discontinuous annular arrangement, with an inner diameter that is less than the inner diameter of the male Mini-Din outer conductor cylinder 25, as shown in FIGS. 9 and 10.

The inwardly-projecting protrusions 155 may be present proximate the distal end as a lip or shoulder, or alternatively as a ramped surface wherein the thickness of the spring finger 112 increases from a proximal end to the distal end. Further, the inwardly-projecting protrusions 155 need not be applied to each of the outer contact spring fingers 112, but may omit some (e.g., every other spring finger 112 may lack a protrusion 155) to form a blocking face that effectively inhibits erroneous mating with a Mini-Din connector 25, as shown in FIGS. 9 and 10. However, because the outer diameter/surfaces of the outer contact 110 of the female connector 105 remain dimensionally unchanged, the female connector 105 remains electromechanically compatible with the full range of male 4.3/10 connectors 20.

The outer contact 110 may be a machined element, or alternatively may be formed via metal stamping or the like.

Figure 11:
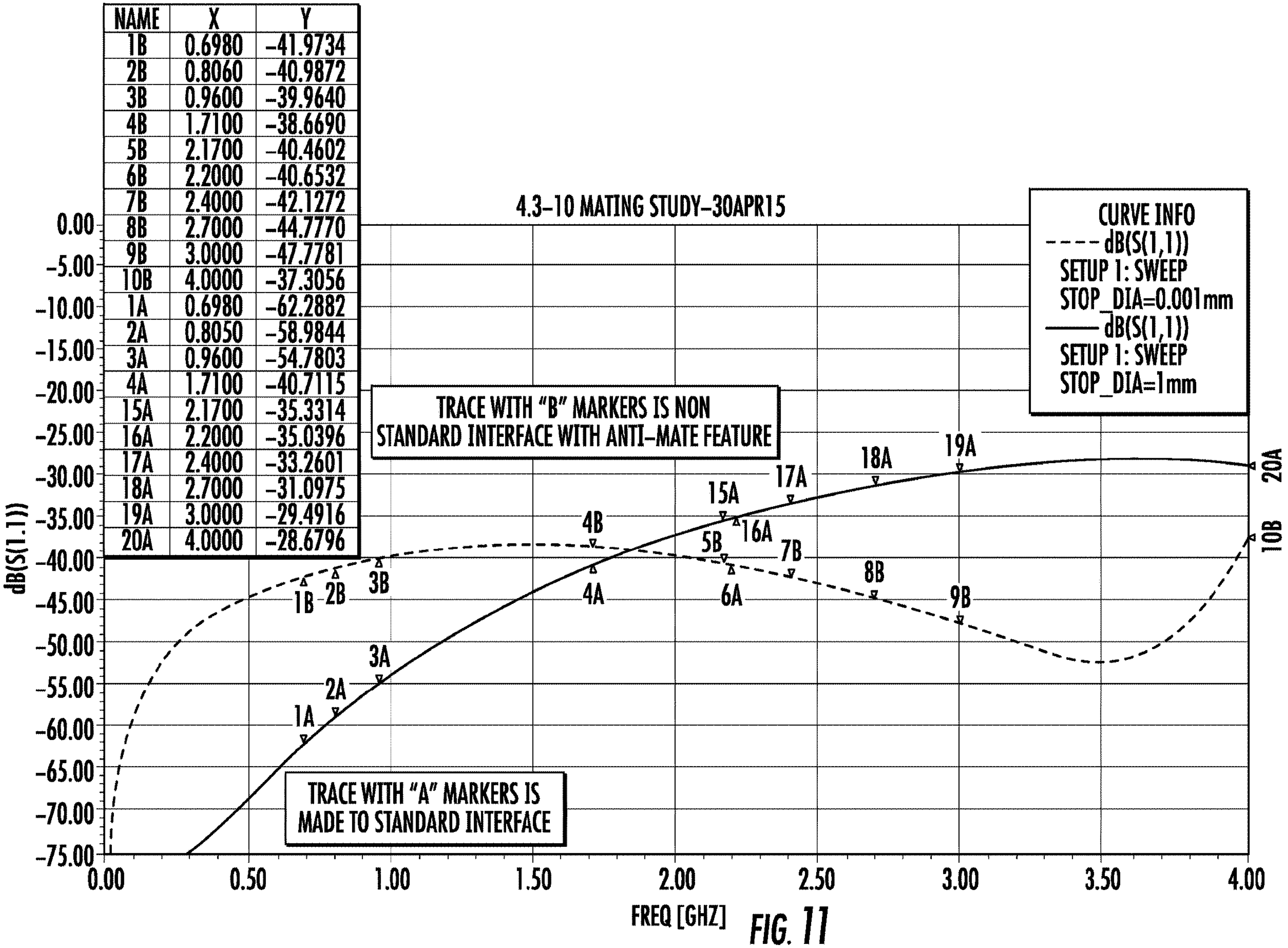
FIG. 11 is a plot of modeled electrical performance, comparing a conventional 4.3/10 female to 4.3/10 male interconnection and a the female connector of FIG. 7 to 4.3/10 male interconnection.

Representative electrical modeling of the interface between the male 4.3/10 connector 20 and the female connector 105 demonstrates that the presence of the inward projecting protrusions 155 into the otherwise cylindrical space CS within the spring fingers 112 does not significantly degrade the electrical performance of an interface with the connector 105 compared to a conventional 4.3/10 connector interconnection (see FIG. 11). One skilled in the art will appreciate that further tuning of the interconnection area may be applied to optimize performance at specifically desired frequency bands. Thus, the connector 105 can improve protection against connector interface damage by providing a block against interconnection with the easily confused variants of the 4.3/10 connection interface, without significantly impacting the electrical performance of the resulting interconnection.

Figure 12:
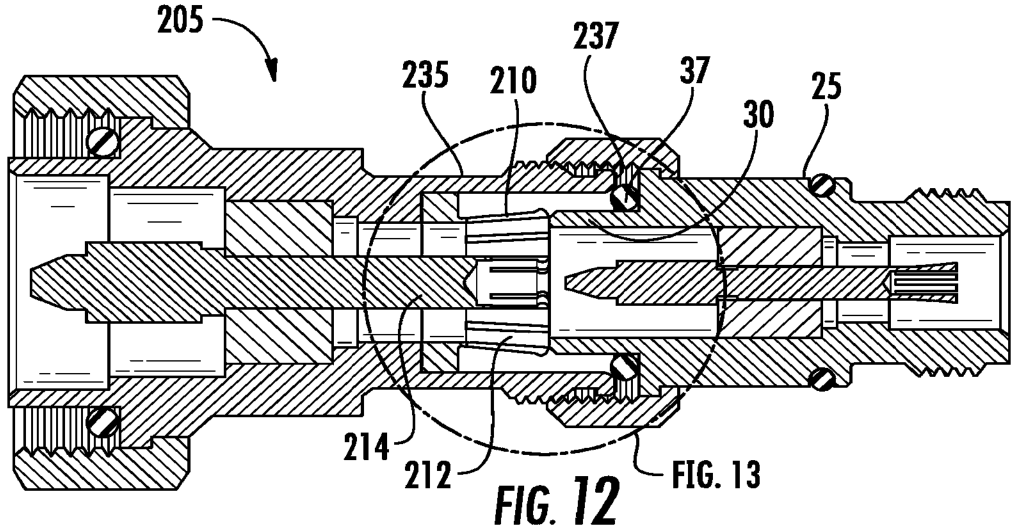
FIG. 12 is a schematic side view of a female connector according to embodiments of the invention, aligned for attempted interface with a male Mini-Din connector, demonstrating the interference between the connector body and the Mini-Din gasket, before the outer contact of the Mini-Din contacts the outer contact of the female connector, inhibiting splaying of the outer contact of the female connector.
Figure 13:
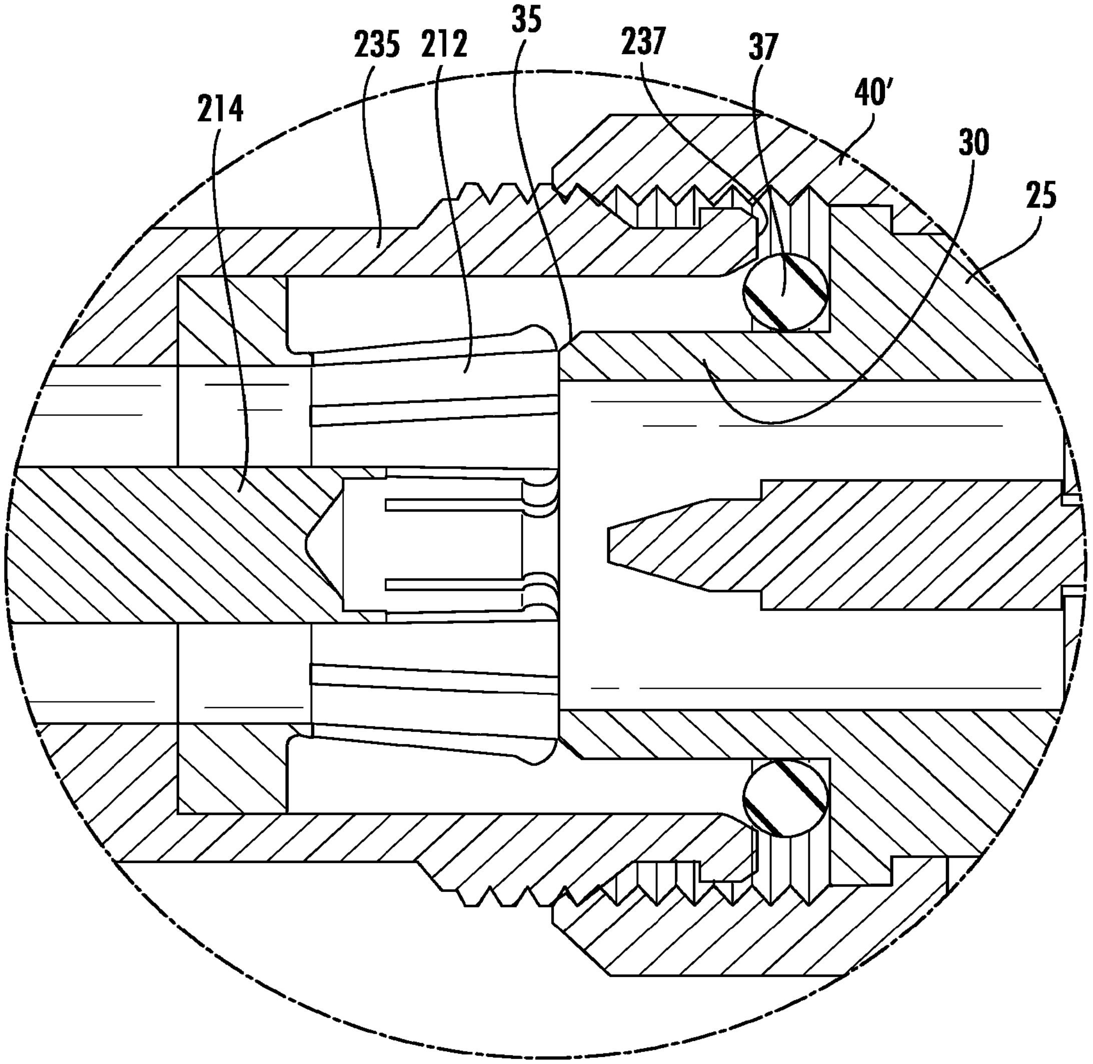
FIG. 13 is a close-up view of area C of FIG. 12.
Figure 14:
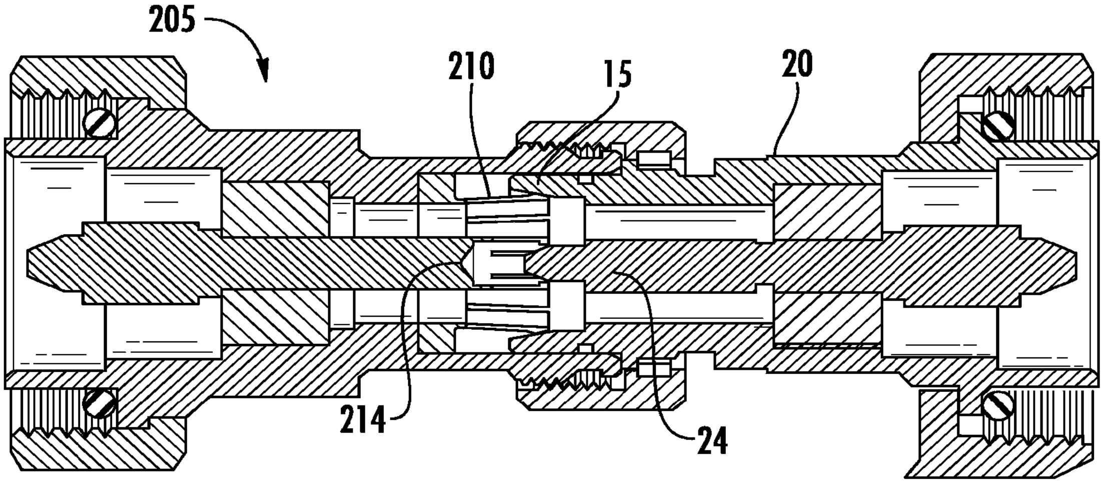
FIG. 14 is a schematic side view of the female connector of FIG. 12 interconnected with a 4.3/10 male connector.
Figure 15:
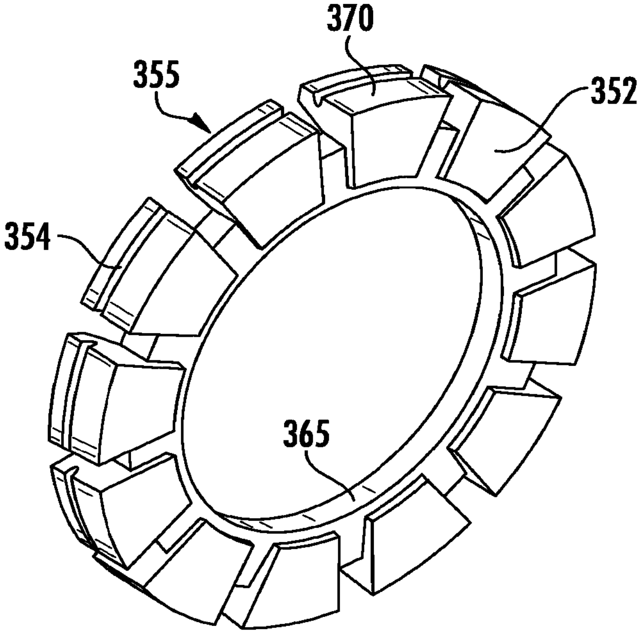
FIG. 15 is a schematic isometric view of a barrier plug with an outer diameter groove.
Figure 16:
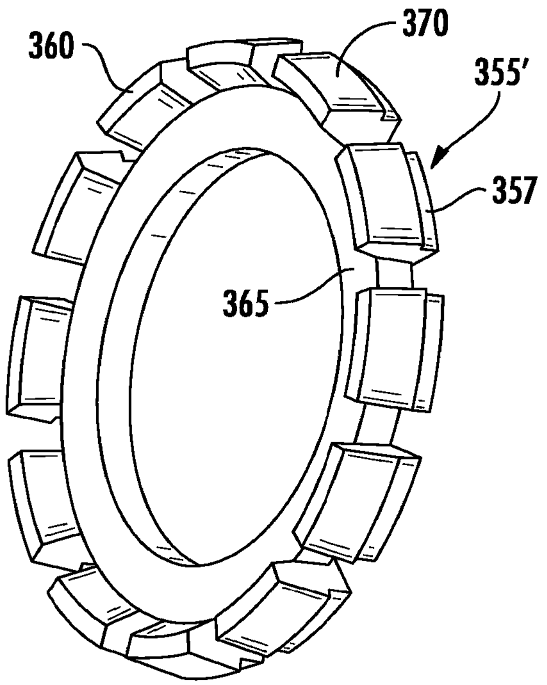
FIG. 16 is a schematic isometric view of an alternative barrier plug with retaining tabs.
Figure 17:
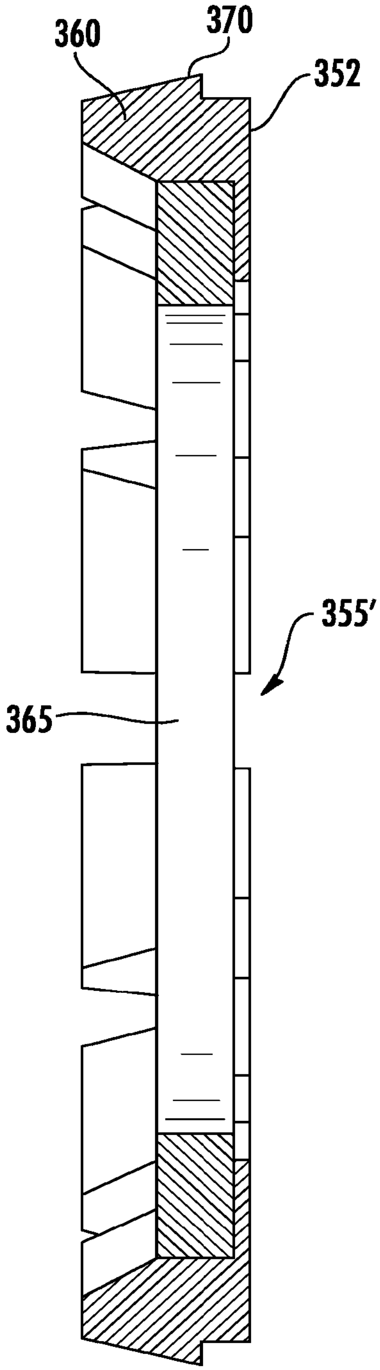
FIG. 17 is a schematic cut-away side view of the barrier plug of FIG. 16.
Figure 18:
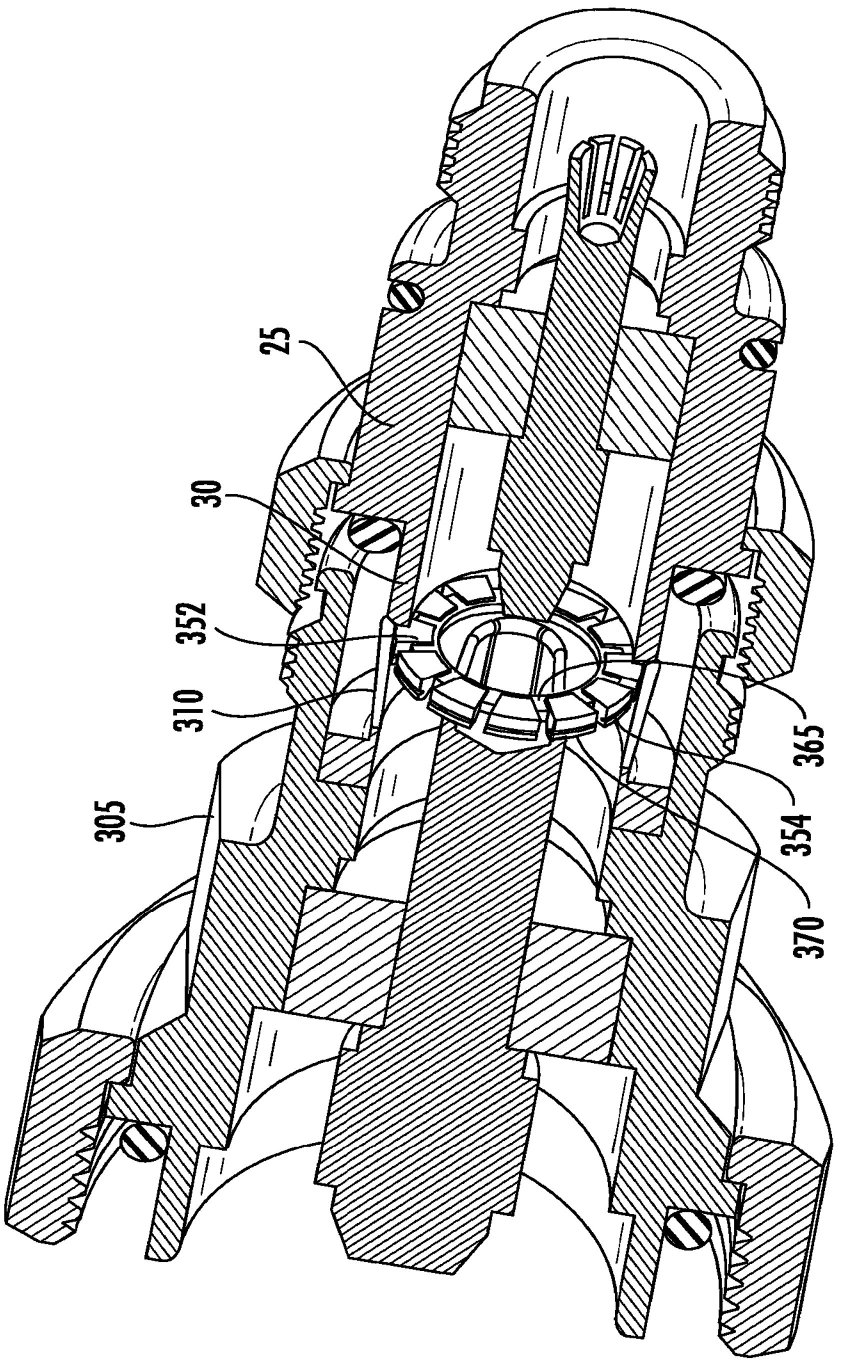
FIG. 18 is a schematic isometric partial cut-away side view of a 4.3/10 female connector with a barrier plug according to FIG. 15, demonstrating the blocking face inhibiting advance of a Mini-Din connector.
Figure 19:
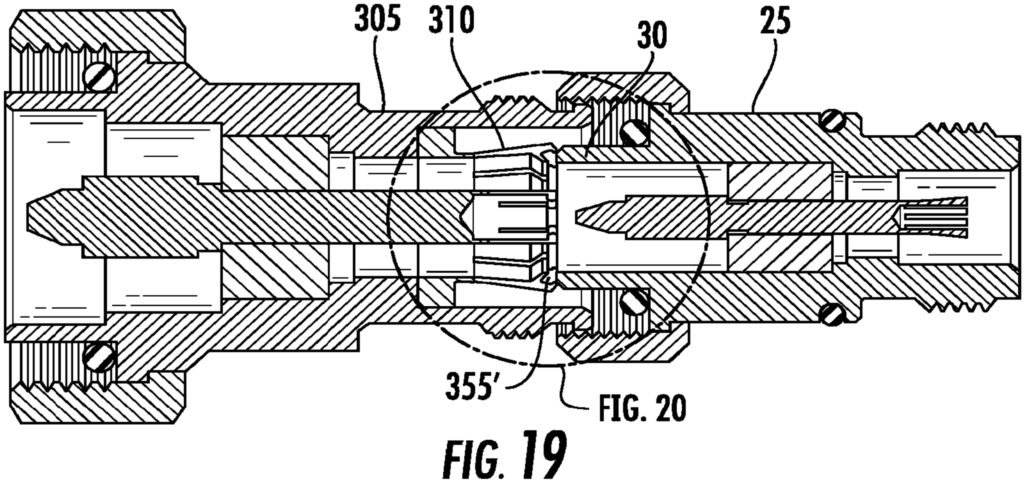
FIG. 19 is a schematic cut-away side view of a 4.3/10 female connector with a barrier plug according to FIG. 16, demonstrating the blocking face inhibiting advance of a Mini-Din connector.
Figure 20:
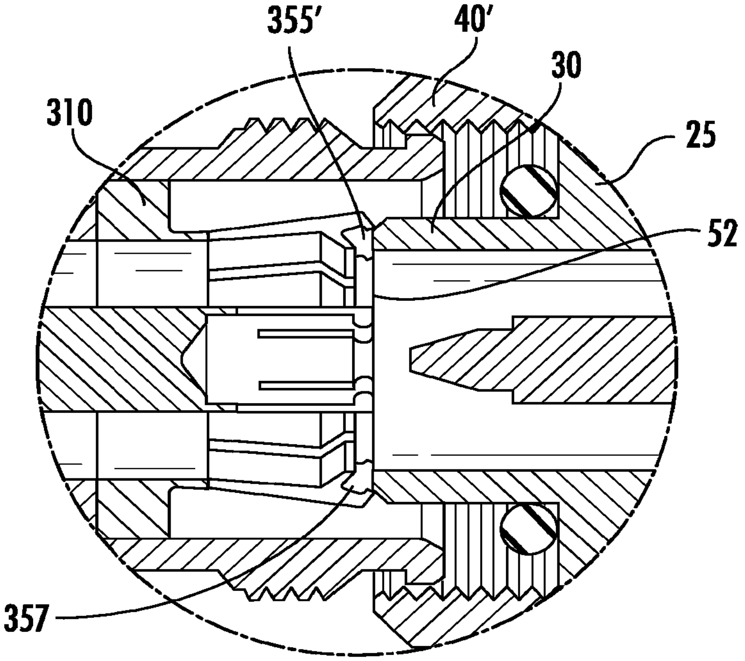
FIG. 20 is a close-up view of area B of FIG. 19.
Figure 21:
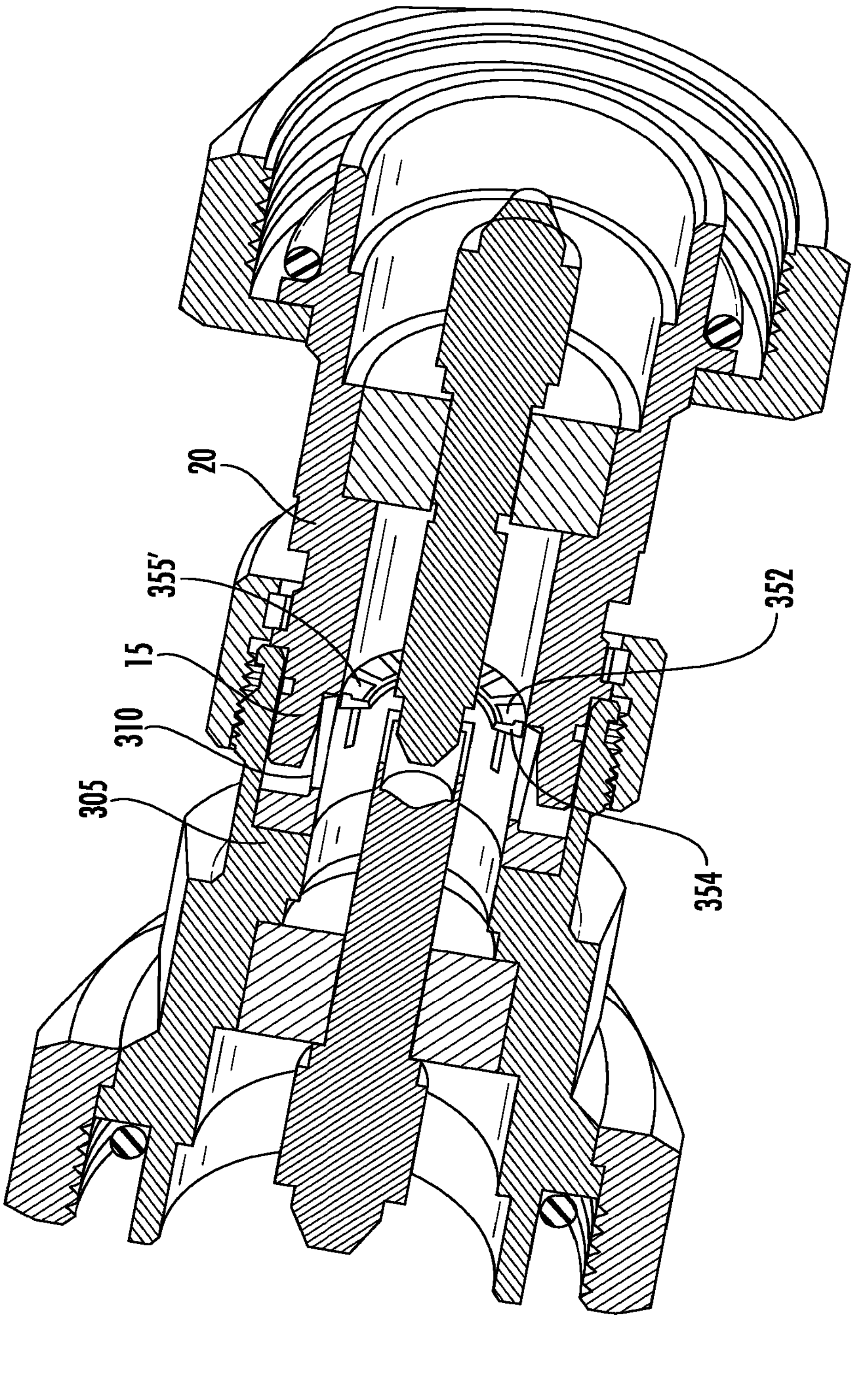
FIG. 21 is a schematic isometric cut-away side view demonstrating a 4.3/10 female connector with a barrier plug according to FIG. 15, demonstrating interconnection with a 4.3/10 male connector. Note the presence of the barrier plug does not inhibit interconnection with the intended mating connector.
Figure 22:
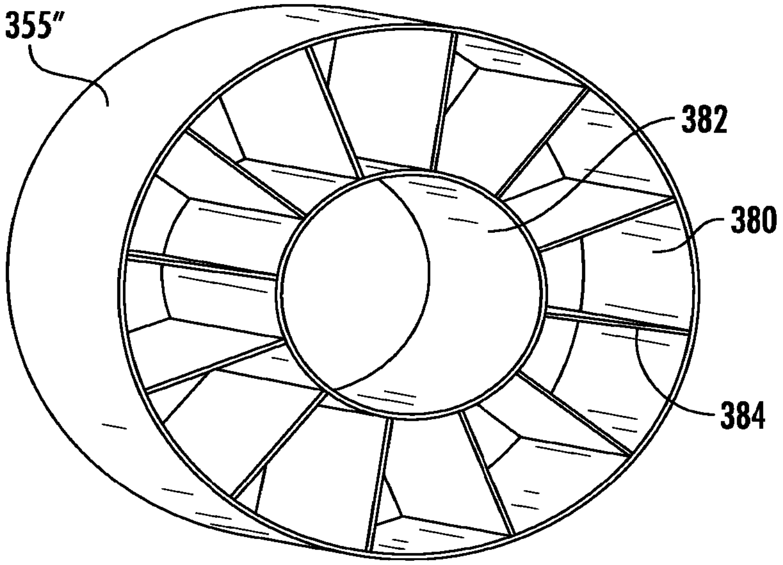
FIG. 22 is a schematic isometric front view of a sleeve-type barrier plug.
Figure 23:
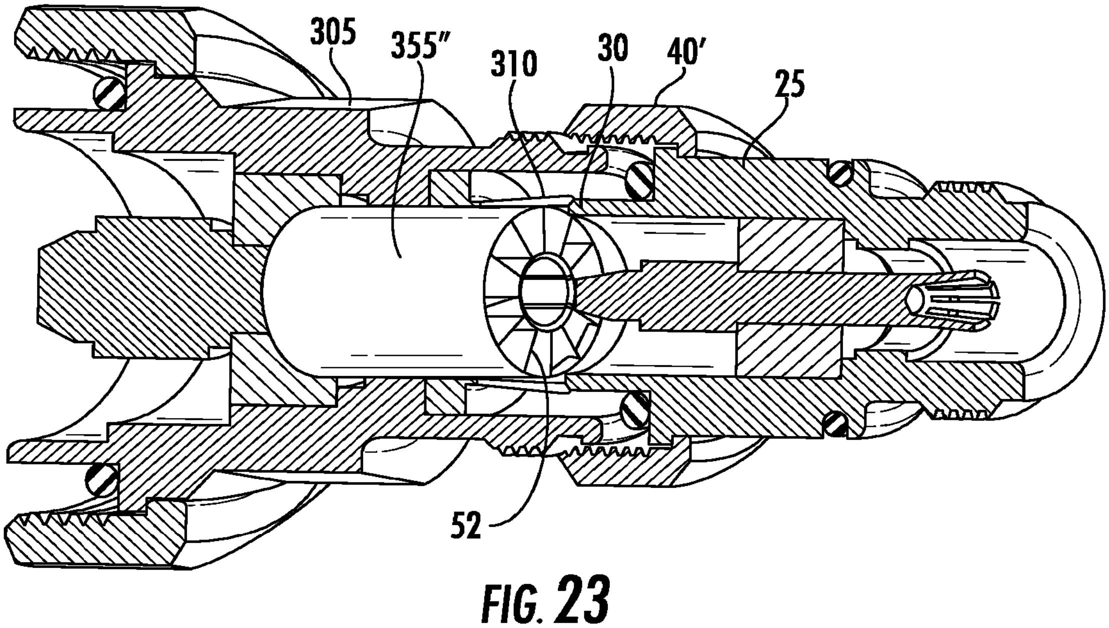
FIG. 23 is a schematic isometric partial cut-away side view of a 4.3/10 female connector with a barrier plug according to FIG. 22, demonstrating the blocking face inhibiting advance of a Mini-Din connector.
Figure 24:
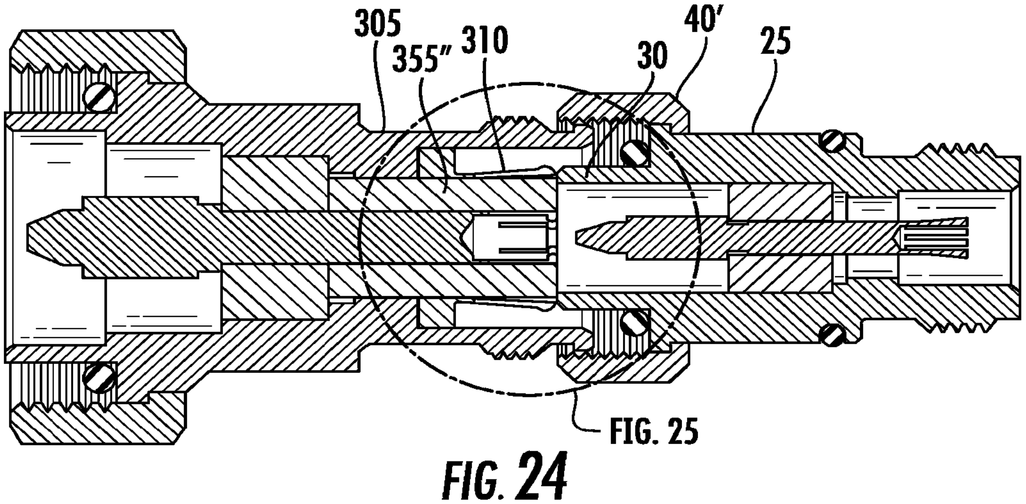
FIG. 24 is a schematic side cut-away view of the attempted interconnection of FIG. 23.
Figure 25:
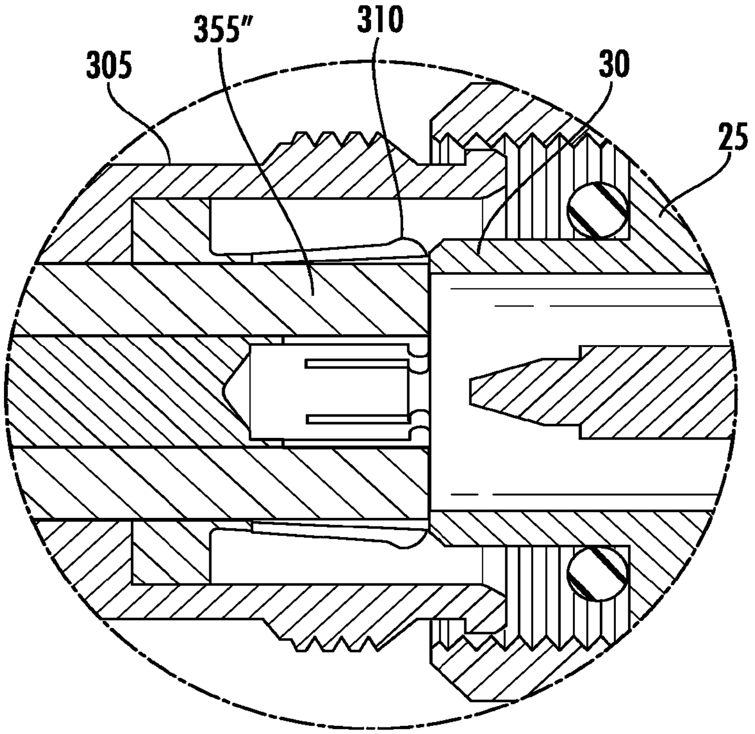
FIG. 25 is a close-up view of area A of FIG. 24.
Figure 26:
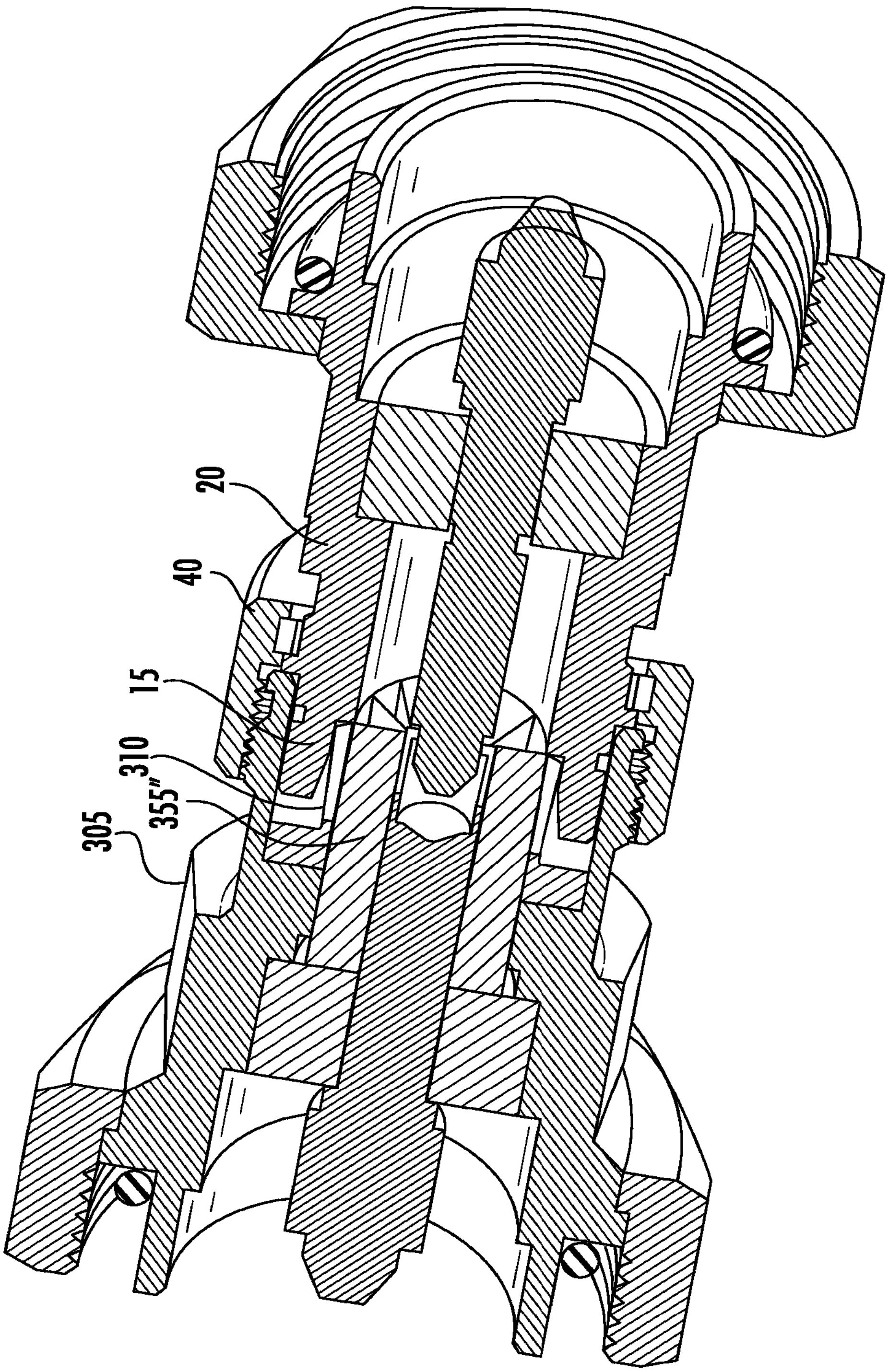
FIG. 26 is a schematic isometric cut-away side view demonstrating a 4.3/10 female connector with a sleeve-type barrier plug according to FIG. 22, demonstrating interconnection with a 4.3/10 male connector. Note the presence of the barrier plug does not inhibit interconnection with the intended mating connector.

Referring now to FIGS. 12-14, another approach to preventing erroneous mating of connectors is shown therein. This approach recognizes that the 4.3/10 interface is capable of correctly mating over a range of insertion depths between the male and female connectors 5, 20. Further, the Mini-Din connector 25 has a generally shallower configuration corresponding to the smaller connection surface diameters of the prescribed Mini-Din interface. FIGS. 12 and 13 illustrate a female connector 205 with a connector body 235 that is longer than is typical. As a result, the outer contact 210 and inner contact 214 are seated deeper within the bore of the connector body 235. Although sufficient depth is present to enable proper mating with a 4.3/10 male connector 20 (see FIG. 14), when a male Mini-Din connector 25 attempts to mate with the female connector 205, the distal end 237 of the connector body 235 bottoms against a gasket 37 of the Mini-Din connector 25 (see FIGS. 12 and 13). As such, the outer conductor connection cylinder 30 of the Mini-Din connector 25 cannot splay the spring fingers 212 of the outer contact 210 of the 4.3/10 female connector 205 (best shown in FIG. 13). Thus, the female connector 205 resists erroneous interconnection with a Mini-Din connector 25 which could otherwise damage it.

The amount of extension applied to the connector body 235 may be selected, for example, to coincide with the maximum extension which enables correct seating of the inner and outer contacts of the 4.3/10 female connector 205 with a male connector 20 according to the 4.3/10 interface specification. Limiting dimensions include, for example, that the inner contact 214 is able to seat at a longitudinal location along the male center pin 24 of the male 4.3/10 connector 20 that enables secure electrical contact to occur. To enhance this dimension further, the inner contact 214 of the female connector 205 may be provided with enhanced inward bias, enabling secure contact to be applied even to a conical end portion of the male center pin 24. This configuration can also allow for tolerance errors. Similarly, the outer contact 210 may be provided with a level of outward bias that enables the outer contact 210 to seat against at least a conical surface of interface cylinder 15 of a 4.3/10 male connector 20 (see FIG. 14).

Because the outer diameter and surfaces of the outer contact 210 of the female connector 205 remain dimensionally unchanged, the connector 205 remains electromechanically compatible with the full range of male 4.3/10 connectors 20. However, the female connector 205 can improve protection against connector interface damage by providing a block against interconnection with the easily confused variants of the 4.3/10 connection interface without significantly impacting the electrical performance of the resulting interconnection.

Referring now to FIGS. 15-26, another approach to prevent unwanted mating of the 4.3/10 female connector is illustrated. This approach recognizes that the ability of the Mini-Din outer conductor connection cylinder 30 to fit within the outer contact of the female connector, thereby splaying the fingers radially outwardly, enables damaging erroneous interconnection between a female 4.3/10 interface and a male Mini-Din connector. As a solution, a female connector 305 includes a barrier plug 355 seated along the inner diameter of the outer contact 310. The barrier plug 355 provides a stop face 352 aligned with a distal end of the outer contact 310 that is operative to prevent insertion of a Mini-Din outer conductor connection cylinder 30 within the outer contact 310 of the female connector 305.

The barrier plug 355 may be interlocked with the outer contact 310. As one example, an inward protrusion of the outer contact spring fingers 312 keys with an outer diameter groove 354 of the barrier plug 355 (shown in FIGS. 15, 18 and 21). In other embodiments, a barrier plug 355' may be interlocked with the outer contact 310 via a seat 357 provided proximate the distal end of the spring fingers 312 that keys with a retaining tab 360 provided on the outer surface 370 of the barrier plug 355' (see FIGS. 16, 17, 19 and 20). Alternatively, protrusions provided on an outer surface of the barrier plug may key with corresponding grooves and/or bores provided in the spring fingers (and vice versa) in any configuration which retains the barrier plug 355 coupled with the outer contact 310.

To prevent the barrier plug 355 from interfering with the range of motion/outward bias of the spring fingers 312 required for secure engagement with the inner diameter of the conical surface of interface cylinder 15 of a 4.3/10 male connector interface (best shown in FIG. 21), the barrier plug 355 may be formed with an interior ring 365 of relatively rigid/higher strength dielectric polymer and an outer surface 370 formed of an elastomeric dielectric polymer (either as an outer ring layer or plurality of outer nubs). Due to the elastomeric nature of the outer surface 370, the presence of the barrier plug 355 may avoid interfering with the relative motion of the spring fingers 312 during initial interconnection alignment and/or negatively impacting the outward bias of the spring fingers, but still have sufficient strength to resist axial displacement along the bore in order to maintain a stop surface 352. The stop surface 352 can prevent the cylinder 30 of a Mini-Din connector 25 from further axial insertion which would otherwise result in splaying the outer contact 310 (see FIGS. 18-20).

One skilled in the art will appreciate that the fit between the outer surface 370 and the spring fingers 312 (combined with the elastomeric properties of the outer surface material that is selected, such as silicon or the like) may also be configured to increase the outward bias of the spring fingers 312, enabling a reduction in the bias properties required for the outer contact 310 alone. This configuration can enable the outer contact 310 to be provided with reduced dimensions and/or be formed of more cost efficient materials than may be possible without the presence of the barrier plug 355. Alternatively, the outer surface 370 may be provided as the relatively rigid/higher strength dielectric polymer while the interior ring 365 is provided as elastomeric dielectric polymer.

In further embodiments, a barrier plug 355" may be formed as an axial extrusion of relatively rigid dielectric material positioned coaxially between the inner and outer contacts (see FIGS. 22-26). The plug 355" includes an outer sleeve 380, an inner sleeve 382 and spokes 384. The plug 355" provides a plurality of apertures between the spokes 384 to minimize material requirements but can still withstand the expected axial insertion forces against the stop face from attempts to apply a Mini-Din connector or the like.

One skilled in the art will appreciate that the application of a barrier plug 355, 355', 355" in the female connection interface of a 4.3/10 connector can improve protection against connector interface damage by providing a stop face against interconnection with the easily confused variants of the 4.3/10 connection interface, without significantly impacting the electrical performance of the resulting interconnection.

Figure 27:
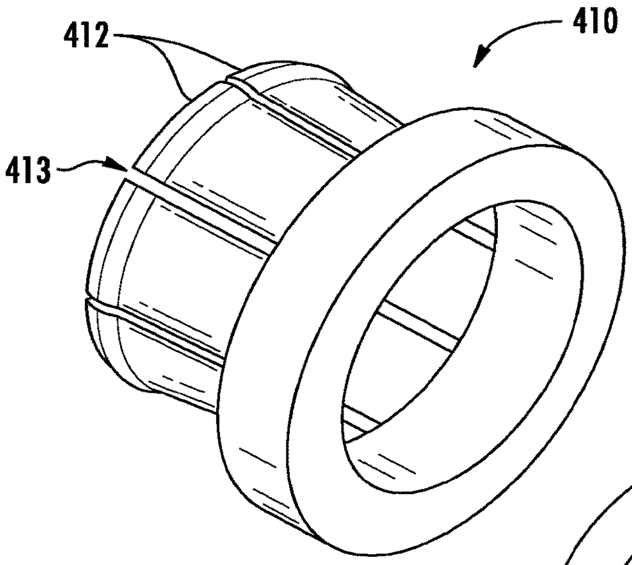
FIG. 27 is a perspective view of the spring basket for an outer conductor body for the coaxial connector of FIG. 7. according to additional embodiments of the invention.
Figure 28:
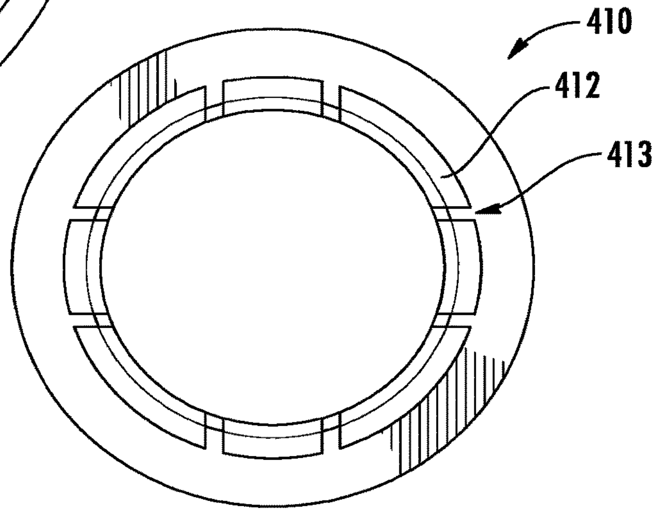
FIG. 28 is an end view of the spring basket of FIG. 27.

As another approach to addressing incorrect mating with a 4.3/10 female connector, it may be desirable to provide a design in which the spring fingers are less susceptible to deformation and breakage. To that end, an additional embodiment of a spring basket 410 for a connector 405 is shown in FIGS. 27 and 28. The spring basket 410 has spring fingers 412 that form a gap with an outer conductor body like that shown at 210 above. As can be seen in FIGS. 27 and 28, the fingers 412 essentially define a ring with slots 413 formed in one end thereof, with the fingers 412 flaring radially outwardly slightly.

It may be desirable for the fingers 412 to exert a similar radial force on the outer conductor body of a mating conductor as that exerted by the fingers 212 described above. For analytical purposes the fingers 412 can be approximated as cantilever beams. The force applied by a deflected cantilevered beam can be calculated as:

$$N=(3DEI)/L^3 \quad (1)$$

wherein

N=the force normal to the beam (in this instance, the radial force generated by the finger 412);

D=the amount of deflection experienced by the beam (i.e., the radial deflection of the finger 412);

E=elastic modulus of the material of the beam/finger 412;

I=moment of inertia through the cross-section of the beam/finger 412; and

L=length of the beam/finger 412.

Thus, for two fingers 412 formed of the same material (such that E is the same in both equations) to exert a similar radial force N on a mating outer conductor, the geometry of the fingers 412 and the overall spring basket 410 may be adjusted. For example, if it is desired to provide a more robust finger 412 that is less susceptible to breakage, the thickness of the finger 412 may be increased. However, increasing the thickness raises the moment of inertia I, which in turn increases the radial force. In addition, a shorter finger 412 may also be less inclined to break under an axial load; however, a decrease in length may also raise the radial force. One manner of addressing the increased radial load is to decrease the amount of deflection induced by mating of the fingers 412 with a mating connector, particularly if the thickness is increased.

For comparative purposes, in the embodiment of the outer conductor body 10 of FIG. 7, the fingers 12 may have a length of between about 0.252 and 0.260 inch, a width of 0.19 to 0.20 inch, a thickness of 0.012 to 0.015 inch, and a deflection distance of between 0.010 and 0.015 inch. As such, applying the concepts discussed above, the embodiment of the spring basket 410 of FIGS. 27 and 28 would have the same width, but would have a decreased length of between about 0.230 and 0.24 inch and an increased thickness of between about 0.015 and 0.018 inch. This decrease in finger length would increase the radial force significantly, which can be counteracted by decreasing the deflection distance induced by mating to between 0.005 and 0.008 inch, with an outer diameter of the ring of fingers being between about 0.46 and 0.47 inch. This approach can generally maintain the radial force of the fingers 412, strengthen the fingers 412 against breakage and/or deformation from the axial overloading of incorrect mating of connectors, and still provide a connector that conforms to the 4.3/10 guidelines.

Notably, this concept can be applied not only to the spring basket discussed above, but also to other connectors conforming to the 4.3/10 interface guidelines that employ radial force between mating conductors, such as those shown in EP 2 304 851, incorporated herein by reference in its entirety.

Figure 29:
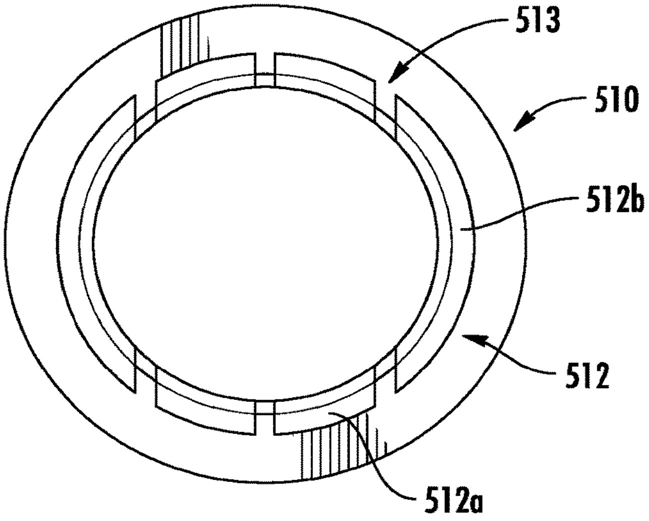
FIG. 29 is an end view of a spring basket for the outer conductor body of a coaxial connector according to still further embodiments of the invention.

FIG. 29 applies the concept to a spring basket 510 that has a slightly different configuration, as the spring basket 510 has only six slots 513 (and therefore six fingers 512) rather than the eight slots 413 and eight fingers 412 discussed above. As can be seen in FIG. 29, the slots 513 are all oriented in the same direction (i.e., toward the top and bottom of the page in FIG. 29), which can simplify manufacturing of the spring basket 510, as the slots 513 may be formed by a saw or other cutting blade. Notably, the fingers 512 are of two different sizes: four fingers 512*a* are of a size similar to the fingers 412, whereas two fingers 512*b* are slightly more than twice the size of the fingers 412. As such, either the thickness or the induced deflection of the fingers 512*b* may be varied if the radial force is to be generally the same as for the fingers 512*a*.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A coaxial connector, interconnectable with a mating coaxial connector, comprising:

an inner contact defining a longitudinal axis;

an outer contact comprising an outer body and a plurality of spring fingers, the outer body having a first contact surface that is directly radially outward of the spring fingers and a first stop surface that is radially outward of the spring fingers; and a dielectric cylinder positioned between the inner contact and the spring fingers, the dielectric cylinder having a free end that is substantially aligned with distal ends of the spring fingers, wherein the outer body is not rotatable relative to the dielectric cylinder;

wherein the spring fingers are positioned to contact and exert radially-outward pressure on a finger contact portion of an outer conductor cylinder of the mating coaxial connector;

wherein the first contact surface is positioned to contact a second contact surface of the outer conductor cylinder of the mating coaxial connector that is radially outward of the finger contact portion; and wherein the first stop surface is positioned to contact a second stop surface of the outer conductor cylinder of the mating coaxial connector, wherein engagement between the first and second stop surfaces prevents further relative axial movement between the mating connectors during mating.

2. The coaxial connector defined in claim 1, wherein the dielectric cylinder is configured and positioned to block a mismating connector.

3. The coaxial connector defined in claim 1, wherein the outer body is configured to engage with a nut that moves relative to the outer body and the spring fingers to secure the coaxial connector to the mating coaxial connector.

4. The coaxial connector defined in claim 3, wherein the nut rotates relative to the outer body to secure the coaxial connector to the mating coaxial connector.

5. The coaxial connector defined in claim 1, wherein a gap is defined between the first contact surface of the outer body and the spring fingers.

6. The coaxial connector defined in claim 1, wherein the outer body is fixed relative to the inner contact.

7. The coaxial connector defined in claim 1, wherein at least a portion of the spring fingers are positioned between the dielectric cylinder and the first contact surface.

8. A coaxial connector, interconnectable with a mating coaxial connector, comprising:

an inner contact defining a longitudinal axis;

an outer contact comprising an outer body and a plurality of spring fingers, the outer body having a first stop surface that is radially outward of the spring fingers; and a dielectric cylinder positioned between the inner contact and the spring fingers, the dielectric cylinder having a free end that is substantially aligned with distal ends of the spring fingers;

wherein the spring fingers are positioned to contact and exert radially-outward pressure on a finger contact portion of an outer conductor cylinder of the mating coaxial connector;

wherein the first stop surface is positioned to contact a second stop surface of the outer conductor cylinder of the mating coaxial connector, the second stop surface being radially outward of the finger contact portion, wherein engagement between the first and second stop surfaces prevents further relative axial movement between the mating connectors during mating; and wherein the outer body does not rotate relative to the dielectric cylinder during securing of the coaxial connector with the coaxial connector.

9. The coaxial connector defined in claim 8, wherein the dielectric cylinder is configured and positioned to block a mismating connector.

10. The coaxial connector defined in claim 8, wherein the outer body is configured to engage with a nut that moves relative to the outer body and the spring fingers to secure the coaxial connector to the mating coaxial connector.

11. The coaxial connector defined in claim 10, wherein the nut rotates relative to the outer body to secure the coaxial connector to the mating coaxial connector.

12. The coaxial connector defined in claim 8, wherein the outer body is fixed relative to the inner contact.

13. A coaxial connector, interconnectable with a mating coaxial connector, comprising:

an inner contact defining a longitudinal axis;

an outer contact comprising an outer body and a plurality of spring fingers, wherein the outer body at least partially encircles the spring fingers along a plane normal to the longitudinal axis, the spring fingers positioned to contact and exert radially-outward pressure on a finger contact portion of an outer conductor cylinder of the mating coaxial connector, wherein the outer body includes features configured to engage a nut movable relative thereto so that the nut secures the mating connectors, and wherein the outer body is fixed relative to the inner contact; and a dielectric cylinder positioned between the inner contact and the spring fingers, the dielectric cylinder having a free end that is substantially aligned with distal ends of the spring fingers.

14. The coaxial connector defined in claim 13, wherein the dielectric cylinder is configured and positioned to block a mismating connector.

15. The coaxial connector defined in claim 13, wherein the outer body is not rotatable relative to the dielectric sleeve.

16. The coaxial connector defined in claim 13, wherein the outer body is fixed relative to the inner contact.

17. The coaxial connector defined in claim 13, wherein the nut rotates relative to the outer body to secure the coaxial connector to the mating coaxial connector.

18. An assembly of coaxial connectors, comprising a first coaxial connector mated with a second coaxial connector;

wherein the first coaxial connector comprises:

a first inner contact defining a longitudinal axis;

an outer contact comprising an outer body and a plurality of spring fingers, wherein the outer body is fixed relative to the first inner contact and at least partially encircles the spring fingers along a plane normal to the longitudinal axis; and a dielectric cylinder positioned between the first inner contact and the spring fingers, the dielectric cylinder having a free end that is substantially aligned with distal ends of the spring fingers;

wherein the second coaxial connector comprises:

a second inner contact; and an outer conductor cylinder that encircles the second inner contact, the outer conductor cylinder including a finger contact portion;

wherein in a mated condition, the spring fingers exert radially-outward pressure on the finger contact portion, and wherein a nut movable relative to the outer body of the first connector and the outer conductor cylinder of the second connector secures the connectors in the mated condition.

19. The assembly defined in claim 18, wherein the nut rotates relative to the outer body to secure the first coaxial connector to second coaxial connector.

20. The assembly defined in claim 18, wherein the outer body has a first contact surface that is directly radially outward of the spring fingers, the first contact surface positioned to contact a second contact surface of the outer conductor cylinder of the second coaxial connector that is radially outward of the finger contact portion.

21. The assembly defined in claim 18, wherein the outer body includes a first stop surface that is radially outward of the spring fingers, the first stop surface positioned to contact a second stop surface of the outer conductor cylinder of the second coaxial connector, the second stop surface being radially outward of the finger contact portion, wherein engagement between the first and second stop surfaces prevents further relative axial movement between the first and second coaxial connectors during mating.

22. An assembly of coaxial connectors, comprising a first coaxial connector mated with a second coaxial connector;

wherein the first coaxial connector comprises:

a first inner contact defining a longitudinal axis;

an outer contact comprising an outer body and a plurality of spring fingers, wherein the outer body is fixed relative to the first inner contact and at least partially encircles the spring fingers along a plane normal to the longitudinal axis; and a dielectric cylinder positioned between the first inner contact and the spring fingers, the dielectric cylinder having a free end that is substantially aligned with distal ends of the spring fingers;

wherein the second coaxial connector comprises:

a second inner contact; and an outer conductor cylinder that encircles the second inner contact, the outer conductor cylinder including a finger contact portion;

wherein in a mated condition, the spring fingers exert radially-outward pressure on the finger contact portion;

wherein the outer body has a first contact surface that is directly radially outward of the spring fingers, the first contact surface positioned to contact a second contact surface of the outer conductor cylinder of the second coaxial connector that is radially outward of the finger contact portion;

wherein the outer body includes a first stop surface that is radially outward of the spring fingers, the first stop surface positioned to contact a second stop surface of the outer conductor cylinder of the second coaxial connector, the second stop surface being radially outward of the finger contact portion, wherein engagement between the first and second stop surfaces prevents further relative axial movement between the first and second coaxial connectors during mating; and wherein a nut movable relative to the outer body of the first connector and the outer conductor cylinder of the second connector secures the connectors in the mated condition.

23. The assembly defined in claim 22, wherein the nut rotates relative to the outer body to secure the first coaxial connector to second coaxial connector.

* * * * *